United States Patent
Dunlap et al.

(10) Patent No.: US 8,947,204 B1
(45) Date of Patent: Feb. 3, 2015

(54) OPTICAL INTERROGATION AND REGISTRATION SYSTEM

(75) Inventors: Philip Dunlap, Rancho Palo Verdes, CA (US); Alan Z. Ullman, Northbridge, CA (US)

(73) Assignee: The Boeing Company, Chicago, IL (US)

( * ) Notice: Subject to any disclaimer, the term of this patent is extended or adjusted under 35 U.S.C. 154(b) by 840 days.

(21) Appl. No.: 13/036,545

(22) Filed: Feb. 28, 2011

Related U.S. Application Data

(63) Continuation-in-part of application No. 12/156,738, filed on Jun. 3, 2008, now Pat. No. 7,920,049.

(51) Int. Cl.
*G05B 19/00* (2006.01)
*G06K 19/06* (2006.01)

(52) U.S. Cl.
CPC ................ *G06K 19/06037* (2013.01)
USPC ....................... 340/5.86; 235/487

(58) Field of Classification Search
CPC .............................. G06K 19/06037
USPC ............. 340/5.86; 235/462.04, 462.06, 460, 235/462.1; 356/394; 250/252.1; 358/5.4, 358/406
See application file for complete search history.

(56) References Cited

U.S. PATENT DOCUMENTS

| | | | |
|---|---|---|---|
| 4,222,662 A | 9/1980 | Kruegle | |
| 4,325,146 A | 4/1982 | Lennington | |
| 4,512,659 A * | 4/1985 | Galbraith et al. | 356/243.1 |
| 4,924,078 A | 5/1990 | Sant'Anselmo et al. | |
| 4,924,144 A | 5/1990 | Menn et al. | |
| 4,958,064 A | 9/1990 | Kirkpatrick | |
| 5,369,261 A * | 11/1994 | Shamir | 235/469 |
| 5,546,209 A * | 8/1996 | Willner et al. | 398/43 |
| 5,789,733 A | 8/1998 | Jachimowicz et al. | |
| 5,859,718 A * | 1/1999 | Yamamoto et al. | 398/51 |
| 6,121,880 A | 9/2000 | Scott et al. | |
| 6,164,548 A * | 12/2000 | Curiel | 235/487 |
| 6,222,452 B1 | 4/2001 | Ahlstrom et al. | |
| 6,222,650 B1 | 4/2001 | Long | |
| 6,345,765 B1 * | 2/2002 | Wiklof | 235/472.01 |
| 6,359,570 B1 | 3/2002 | Adcox et al. | |
| 6,635,333 B2 | 10/2003 | Grigg et al. | |
| 6,678,237 B1 * | 1/2004 | Edwards et al. | 369/286 |
| 6,763,140 B1 | 7/2004 | Skoll | |

(Continued)

FOREIGN PATENT DOCUMENTS

WO  WO 2006/059515 A1 *  6/2006

OTHER PUBLICATIONS www.dodsbir.net/awardlist/abs011/socomabs011.htm; SOCOM, Phase 1 selections from the 01.1 solicitation; Photon-X, Inc.; Award Mar. 29, 2001; 7 pages.

*Primary Examiner* — Daniel Wu
*Assistant Examiner* — Frederick Ott
(74) *Attorney, Agent, or Firm* — Armstrong Teasdale LLP

(57) ABSTRACT

A system and method for identifying an object are provided. An encoded substrate includes at least one layer of material having a matrix of zones arranged on surface thereof to represent optically coded information. At least one zone of the matrix of zones is configured to absorb a predetermined first wavelength of an electromagnetic radiation. A scanner is configured to receive a reflected electromagnetic radiation associated with the matrix of zones. The optically coded information is extracted from the reflected electromagnetic radiation.

19 Claims, 5 Drawing Sheets

(56) References Cited

U.S. PATENT DOCUMENTS

| | | |
|---|---|---|
| 6,894,615 B2 | 5/2005 | Look |
| 7,074,478 B2 | 7/2006 | Abraham |
| 7,352,290 B2 | 4/2008 | Eskridge |
| 7,463,150 B2 | 12/2008 | Rajan |
| 7,557,715 B1 | 7/2009 | Noakes et al. |
| 7,970,644 B2 | 6/2011 | Hedley et al. |
| 2002/0160786 A1* | 10/2002 | Rietzler et al. ............... 455/455 |
| 2004/0004539 A1 | 1/2004 | Collins |
| 2004/0183712 A1 | 9/2004 | Levitan et al. |
| 2005/0256763 A1 | 11/2005 | Bohonnon |
| 2005/0258238 A1 | 11/2005 | Chapman |
| 2005/0264001 A1* | 12/2005 | Kerns et al. ..................... 283/81 |
| 2006/0022059 A1 | 2/2006 | Juds |
| 2007/0229285 A1 | 10/2007 | Smith |
| 2007/0285232 A1 | 12/2007 | Bohman et al. |
| 2008/0000990 A1* | 1/2008 | Thomas ......................... 235/494 |
| 2008/0068180 A1 | 3/2008 | Powell et al. |
| 2008/0122995 A1* | 5/2008 | Kamada et al. ................... 349/2 |
| 2008/0129581 A1 | 6/2008 | Douglass et al. |
| 2010/0007710 A1 | 1/2010 | Miyaso |

* cited by examiner

OPTICAL INTERROGATION AND REGISTRATION SYSTEM

CROSS REFERENCE TO RELATED APPLICATIONS

This application is a continuation-in-part of U.S. patent application Ser. No. 12/156,738, filed Jun. 3, 2008 now U.S. Pat. No. 7,920,049, which is hereby incorporated by reference in its entirety.

BACKGROUND OF THE DISCLOSURE

The subject matter described herein relates generally to remote identification of an object and, more particularly, to methods and systems for use in analyzing a remote substrate including encoded information.

Following the terrorist attacks of Sep. 11, 2001, it became clear that, despite security measures, the United States of America can be attacked asymmetrically by an enemy. One possible method of attack could entail transporting a weapon of mass destruction or other threat into the United States using land, sea, and/or air vehicles that approach or penetrate our borders. The likelihood is heightened considering that the number of sea-going vessels, aircraft, and land vehicles, as well as shipping containers and other packaging for goods, entering our and other nations through various ports and across borders exceeds several tens of millions annually, and that this number is steadily increasing each year. Moreover, distinguishing between each class of vessel or vehicle or package is often very difficult and/or time consuming. In addition, reliably identifying a container and its contents may be even more difficult and may require several on-site re-inspections.

Systems for tracking land vehicles and determining the legitimacy of their registration have been developed. One known system enables law enforcement officers to rapidly identify stolen license plates, stolen vehicles and/or expired registrations. The system uses a scanner that receives and analyzes data stored in a chip carried in the annual registration decal. The scanner interfaces with an on-board computer that communicates with a central law enforcement database server via a wireless transmission. However, this system can only scan registration decals that are essentially within the immediate visual proximity of the officer wielding the scanner. Moreover, the system requires the placement of a physical instrumentality, i.e. the chip, within the registration decal.

Present methods of identifying incoming vessels, vehicles and/or containers include inspection, re-inspection, and tracking the transportation modality to locate and read, for example at a distance with binoculars or up close with the naked eye, the registration and/or content information. In some instances, very-close range inspection of vessels is needed to ascertain the identity of an entity observed acting oddly. In other instances, vessels may be interrogated by unauthorized third parties and/or the interrogation may be intercepted by unauthorized third parties. In any major port, hundreds of utility boats, sailboats and pleasure craft go unmonitored. In cargo ships, containers are spot-checked, but millions of containers are virtually unmonitored. Systems that broadcast unit identification and movement are expensive. Nor are private vehicles and utility craft subject to routine port inspection as such activities would require more equipment and personnel than is presently available. Thus the security monitoring is sporadic and incomplete.

It would therefore be highly desirable to have a registration and identification system for determining information about place of origin, legitimacy of registration, and security inspections of the vehicle, vessel, or container. Further, it would be desirable to have an integrated system of this kind that allows for interrogation of this information at significant distances from a remote location (e.g., from locations with a commanding view over a large area or of a strategic passage or checkpoint) in a manner which is not readily intercepted by others. Moreover, enhanced vessel, vehicle or container identification technologies to maintain security measures at ports or border through stations are urgently needed to enhance national security and the orderly flow of world commerce. The present disclosure proposes one solution that entails implementing a vessel, vehicle, and container registration system based on encoded information carried on or integrated to a substrate that can be remotely interrogated.

SUMMARY OF THE DISCLOSURE

In one aspect, a method is provided for identifying an object. The method includes coupling at least one layer of material to the object. The at least one layer has a matrix of zones arranged on a surface thereof to represent optically coded information associated with the object. At least one zone of the matrix of zones is configured to absorb a predetermined first wavelength of an electromagnetic radiation. A reflected electromagnetic radiation associated with the matrix of zones is received, and the optically coded information is extracted from the reflected electromagnetic radiation.

In another aspect, an encoded substrate is provided. The encoded substrate includes at least one layer of material having a matrix of zones arranged on surface thereof to represent optically coded information. At least one zone of the matrix of zones is configured to absorb a predetermined first wavelength of an electromagnetic radiation.

In yet another aspect, a system is provided for identifying an object. The system includes a substrate including at least one layer of material having a matrix of zones arranged on a surface thereof to represent optically coded information associated with the object. At least one zone of the matrix of zones is configured to absorb a predetermined first wavelength of an electromagnetic radiation. A scanner is configured to receive a reflected electromagnetic radiation associated with the matrix of zones. The optically coded information is extracted from the reflected electromagnetic radiation.

Further aspects of the method for determining a registry of an object, the encoded substrate, and the system for determining a registry of an object are described herein. The features described above, as well as other features and advantages of the present disclosure, will be appreciated and understood by those skilled in the art from the following detailed description and drawings.

DETAILED DESCRIPTION OF THE DISCLOSURE

The present disclosure is described more fully hereinafter with reference to the accompanying drawings, in which exemplary embodiments are illustrated. In one embodiment, optically-encoded properties are coupled to an object to enable an interrogation system to efficiency receive information from the object. However, many different embodiments are contemplated and the present disclosure should not be construed as being limited to the embodiments set forth herein, but rather, these embodiments are provided so that this disclosure will be thorough and complete and better convey the scope of the disclosure to those skilled in the art.

As used herein, an element or step recited in the singular and proceeded with the word "a" or "an" should be understood as not excluding plural elements or steps unless such exclusion is explicitly recited. Furthermore, references to "one embodiment" of the present invention are not intended to be interpreted as excluding the existence of additional embodiments that also incorporate the recited features. Moreover, as used herein, the term "optical beam" includes electromagnetic radiation having a wavelength between approximately 10 nanometers (nm) and 300,000 nm. That is, the electromagnetic radiation may have a wavelength in, for example, an infrared spectrum, a visible spectrum, and/or an ultraviolet spectrum.

The present disclosure provides an interrogation system that includes a substrate encoded with registration data for an object on which the substrate is coupled. The object may be a transportation modality such as, without limitation, a sea-going vessel, a vehicle, and/or a container structure. An optical interrogation device or scanner interrogates the object by directing electromagnetic radiation at the encoded substrate. Reflected electromagnetic radiation is received from the encoded substrate, and coded information is extracted from the reflected electromagnetic radiation. The interrogation system enhances the efficiency of receiving information from transportation modalities and/or shipping containers.

Figure 1:
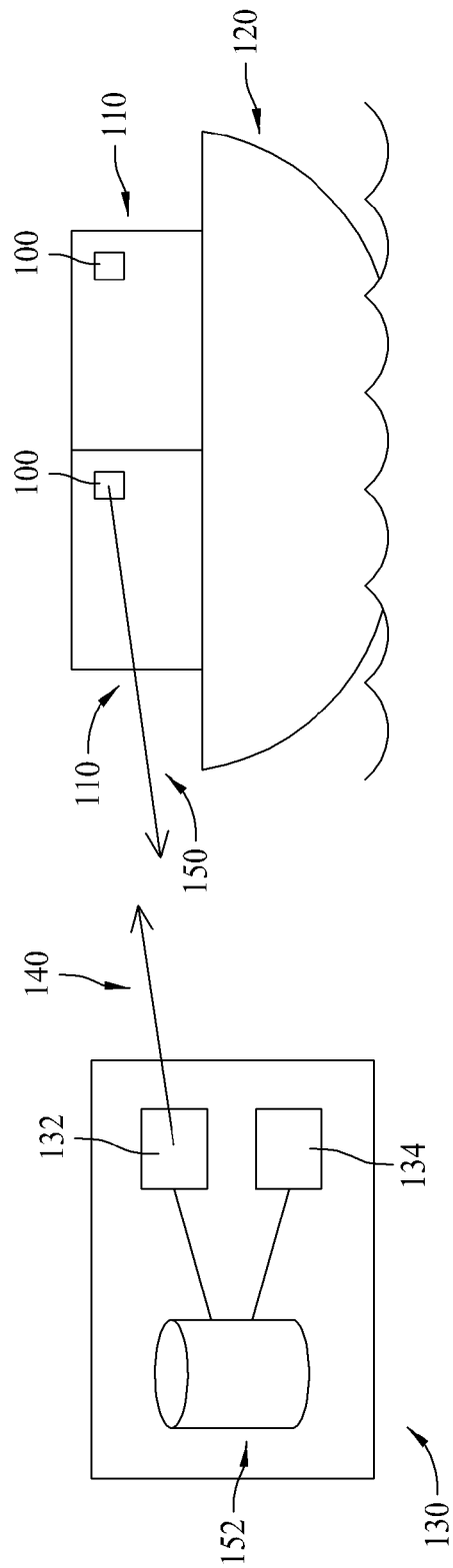
FIG. 1 is a schematic representation of an exemplary interrogation system including an exemplary substrate.

FIG. 1 is a schematic representation of an exemplary interrogating system. In the exemplary embodiment, the system includes a substrate 100 that is coupled to a cargo container 110 carried aboard a vessel 120. More specifically, in the exemplary embodiment, substrate 100 is a decal or an appliqué that is encoded with information regarding, for example, contents of container 110, taxes or tariffs related to the contents and/or handling, entry, environment conditions, or other information associated with container 110. Alternatively, substrate 100 may be embedded directly into and/or integrated with the structure of vessel 120. In such an embodiment, substrate 100 may be encoded with information regarding, for example, ownership, registration, history, and/or inspection history. In another embodiment, substrate 100 may be coupled to any suitable object and/or surface in any suitable manner that enables the system and/or substrate 100 to function as described herein. As such, substrate 100 has any suitable shape, size, and/or configuration that enables substrate 100 to function as described herein.

In the exemplary embodiment, a scanner or an interrogation device 130 is used to interrogate container 110 by directing an optical beam 140 towards substrate 100. In the exemplary embodiment, substrate 100 may have a unique pattern and/or "fingerprint" that enables interrogation device 130 to uniquely identify substrate 100 and/or container 110 or vessel 120 to which substrate is coupled. In such an embodiment, information associated with the fingerprint may be updated and/or modified to reflect changes to container 110 and/or vessel 120. Additionally or alternatively, substrate 100 may have properties and/or characteristics indicative of the encoded information, and the properties and/or characteristics of substrate 100 may be updated and/or modified to reflect changes to container 110 and/or vessel 120.

Interrogation device 130, in the exemplary embodiment, includes a projection system 132 and a receiver 134. More specifically, an optical beam 140 is transmitted from projection system 132 towards substrate 100. For example, interrogation device 130 may be, without limitation, a handheld flashlight, a general search light, and/or a laser. Moreover, an optical beam 150 reflected from substrate 100 is received by receiver 134. Alternatively, substrate 100 reflects ambient light such as, without limitation, sunlight, moonlight, and/or general lighting such as deck lights, and interrogation device 130 receives optical beam 150 reflected from substrate 100. In the exemplary embodiment, reflected optical beam 150 is representative of and/or associated with the information encoded in substrate 100.

Figure 2:
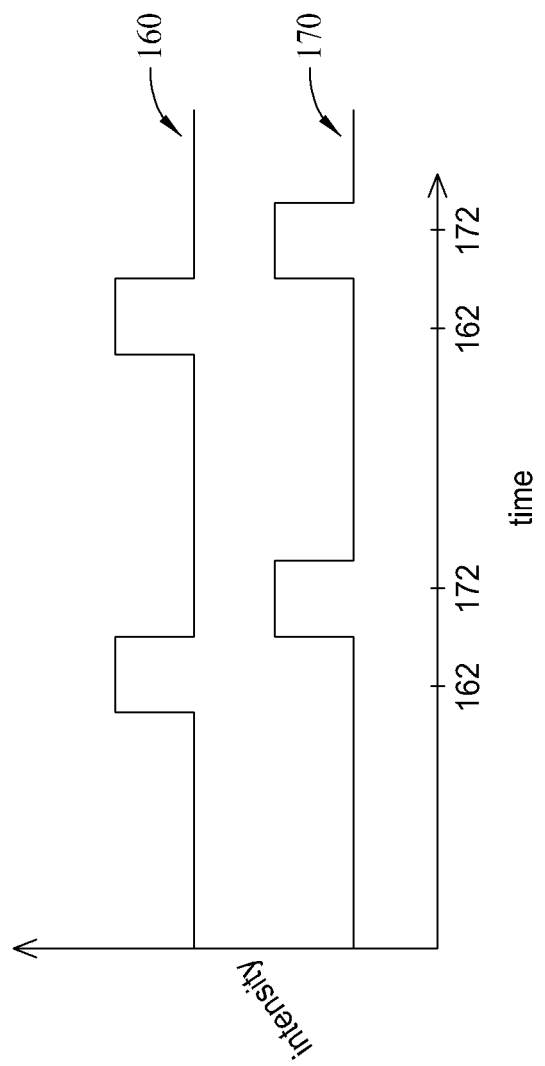
FIG. 2 is a schematic representation of an exemplary optical beam being transmitted over time.

In the exemplary embodiment, interrogation device 130 transmits a single, multi-spectral optical beam 140. For example, in one embodiment, optical beam 140 may be a nanosecond "flash-cube-like" burst of light or a continuous beam that includes a plurality of wavelengths. Alternatively, interrogation device 130 may selectively transmit each of a plurality of wavelengths of optical beam 140 at a respective point in time. For example, as shown in FIG. 2, interrogation device 130 may direct a first wavelength 160 at a first time 162 and may direct a second wavelength 170 at a second time 172. Moreover, in one embodiment, optical beam 140 is broadly illuminated such that a plurality of regions, described in more detail below, are interrogated substantially simultaneously. Alternatively, optical beam 140 may be narrowly illuminated such that a predetermined region is selectively interrogated.

In one embodiment, optical beam 140 is coherent. That is, in such an embodiment, a wavelength of optical beam 140, a transmission interval, and/or a transmission direction may be predetermined to include encoded information. Transmitting a coherent optical beam 140 may, for example, enable receiver 134 to distinguish reflected optical beam 150 from noise. Alternatively, optical beam 140 is not coherent. That is, optical beam 140 does not intrinsically include encoded information, but rather optical beam 140 includes at least one predetermined wavelength.

In the exemplary embodiment, interrogation device 130 extracts information from reflected optical beam 150. For example, information may be extracted from a pattern of wavelengths in reflected optical beam 150 and/or from a pattern of wavelengths not included in reflected optical beam. In the exemplary embodiment, information extracted from reflected optical beam 150 is compared to a library 152 stored in interrogation device 130. Alternatively, library 152 may be stored in a remote memory device (not shown) that is communicatively coupled to interrogation device 130. Library 152 may include a database of values representing known information including, without limitation ownership information, registration information, tax or tariff information, port information, inspection information, content information, security information, safety information, cargo information, and/or other information.

In one embodiment, a first portion (not shown) of interrogation device 130 is positioned at a first location, and a second portion (not shown) of interrogation device 130 is positioned at a second location. In such an embodiment, the first portion transmits optical beam 140, and the second portion receives reflected optical beam 150. Moreover, in one embodiment, substrate 100, optical beam 140, and/or reflected optical beam 150 may be visible or invisible to the naked eye. As such, container 110 may be selectively interrogated without an owner and/or a possessor of vessel 120 having knowledge that the encoded information is sought, found, and/or read by interrogation device 130.

Figure 3:
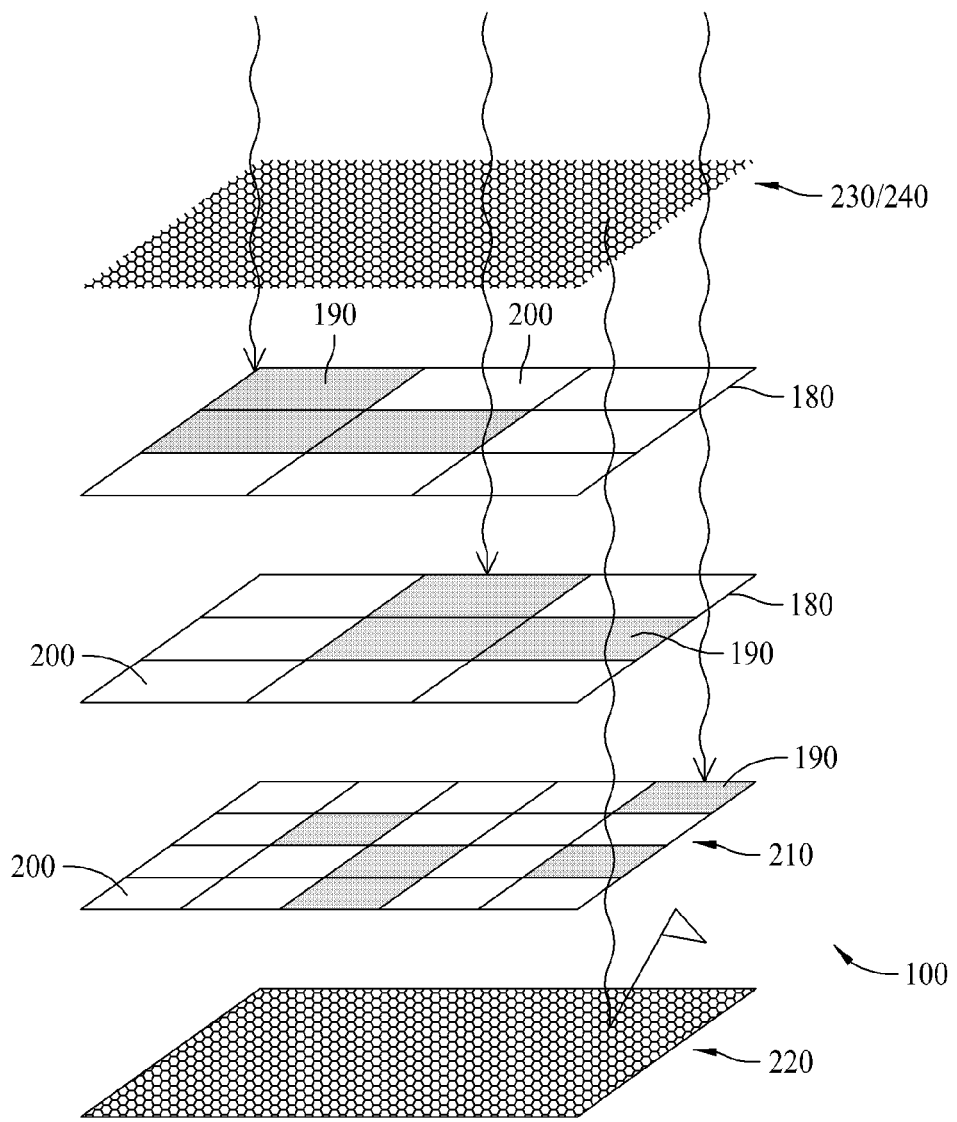
FIG. 3 is an exploded view of the substrate shown in FIG. 1.

FIG. 3 is an exploded view of an exemplary substrate 100. In the exemplary embodiment, substrate 100 includes at least one layer 180 that is optically reflective, absorbent, and/or transparent or transmissive to a predetermined wavelength. More specifically, in the exemplary embodiment, layer 180 is formed with at least a first zone or region 190 that absorbs first wavelength 160 (shown in FIG. 2) and a distinct zone or second region 200. That is, with respect to first wavelength 160, first region 190 may be viewed as giving a negative signal and/or value when interrogated by interrogation device 130, and second region 200 may be viewed as giving a positive signal and/or value when interrogated by interrogation device 130. In one embodiment, substrate 100 includes a plurality of layers 180 that each has properties and/or characteristics associated with a respective wavelength. For example, first region 190 of one layer 180 may be configured to absorb first wavelength 160, and first region 190 of another layer may be configured to absorb second wavelength 170 (shown in FIG. 2).

In one embodiment, optical properties of first region 190 and second region 200 are predetermined as a function of chemical elements or compositions thereof that have been added, such as, for example, via a chemical mixture and/or via a coating applied, to layer 180. For example, an aerosol spray and/or an adhesive having predetermined optical properties may be applied to layer 180. Such chemicals may be integrated with and/or applied to layer 180 in solid, liquid, or gaseous form. For example, in one embodiment, layer 180 may be subjected to environmental and/or atmospheric conditions and/or energies including, without limitation, exposure to radiation, ion, heat, cold, vacuum, pressure, and/or other conditions that enable layer 180 to function as described herein. For example, in one embodiment, layer 180 is a plastic material that is mixed with a chemical composition to create a specific optical absorbent property. Alternatively, optical properties of first region 190 and second region 200 may be a function of structural changes (e.g., a crystalline growth) or be formed through plastic reflective physical shaping (e.g., "cuts") of layer 180. For example, in one embodiment, a roller (not shown) and/or any other applicator may be used to form reflective angles and/or corner-cube reflectors on a surface of layer 180. In another embodiment, a plurality of refractive beads may be positioned across a surface of layer 180 such that optical beam 140 and/or reflected optical beam 150 are refracted based on a difference in optical densities between the air and the refractive beads.

In the exemplary embodiment, first region 190 and second region 200 are each arranged in a predetermined position that encodes information. In the exemplary embodiment, first region 190 and second region 200 are arranged in an N×M matrix or array, wherein N represents the number of rows, and M represents the number of columns. More specifically, in the exemplary embodiment, an N×M matrix having two optical properties such as, for example, absorption and non-absorption would yield (N×M)P possible combinations of values, where P is the number of optical properties. Additional and/or alternative optical properties may include, without limitation, polarized reflection (e.g., horizontal, vertical, and/or circular) and/or non-polarized reflection. Further, using K layers having P optical properties for an N×M matrix could yield $((N\times M)^P)^K$ unique values. Alternatively, regions 190 and 200 may be arranged in any suitable configuration that enables substrate 100 to function as described herein. For example, in one embodiment, regions 190 and 200 may be arranged in a non-contiguous and/or non-linear configuration. In another embodiment, a matrix may be implied on container 110 and/or vessel 120. That is, receiver 134 may detect container 110 and/or vessel and implicitly define a matrix on a surface of container 110 and/or vessel.

In the exemplary embodiment, substrate 100 includes a calibrating layer 210 that enables interrogation device 130 to compensate for localized and/or global attenuation effects such as, without limitation, atmospheric and/or environmental attenuation. In the exemplary embodiment, calibrating layer 210 has a predetermined arrangement of first and second regions 190 and 200 that enables calibrating layer 210 to have a higher spatial resolution than layer 180. That is, in the exemplary embodiment, the values of N and/or M for calibration layer 210 are greater than the values of N and/or M for layer 180. In the exemplary embodiment, interrogation device 130 receives reflected optical beam 150 from calibrating layer 210 and compares information extracted from reflected optical beam 150 with a value associated with calibrating layer 210 stored in library 152.

In the exemplary embodiment, substrate 100 includes a base layer 220 extending below layer 180 and oriented such that layer 180 generally covers base layer 220. In the exemplary embodiment, base layer 220 is fabricated from a material that is substantially opaque and/or is substantially reflective at substantially all optical wavelengths. That is, in the exemplary embodiment, wavelengths that are not absorbed by layer 180 may be reflected by base layer 220 to produce reflected optical beam 150. In the exemplary embodiment, layer 180 may have at least one region that enables reflected optical beam 150 to be polarized. In an alternative embodiment, substrate 100 does not include a base layer 220, bur rather, in such an embodiment, layer 180 is coupled directly against container 110 and/or vessel 120. In such an embodiment, wavelengths that are not absorbed by layer 180 may be reflected by container 110 and/or vessel 120 to produce reflected optical beam 150. In such an embodiment, layer 180 may have at least one region that enables reflected optical beam 150 to be polarized. In yet another alternative embodiment, layer 180 is optically reflective, and base layer 220 is selected to absorb substantially all optical wavelengths. In such an embodiment, wavelengths that are reflected by layer 180 produce reflected optical beam 150, and wavelengths that are not reflected by layer 180 may be absorbed by base layer 220. In the exemplary embodiment, layer 180 may have at least one region that enables reflected optical beam 150 to be polarized.

Figure 4:
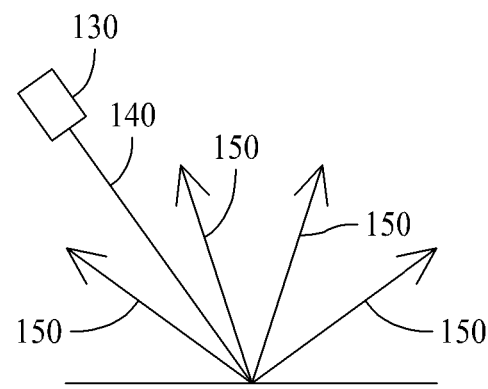
FIGS. 4-6 are exemplary reflections of an optical beam.
Figure 5:
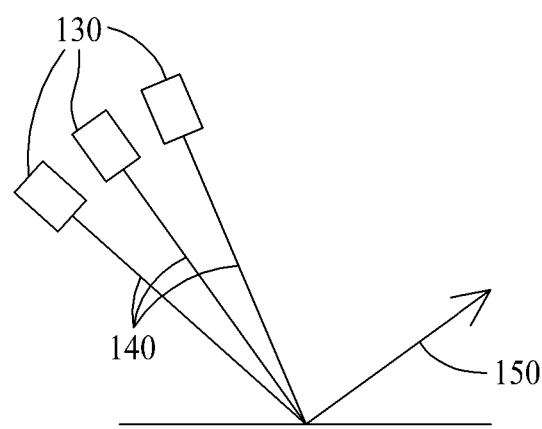
Figure 6:
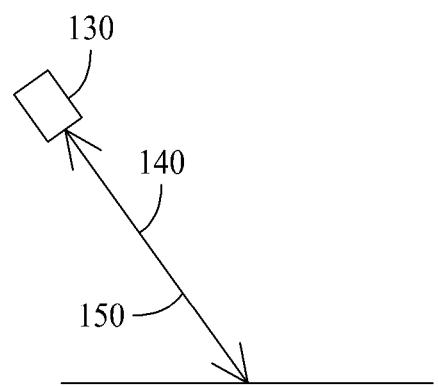

In the exemplary embodiment, base layer 220 includes a reflective material and/or has reflective properties that facilitate enhancing reflective optical beam 150. Enhancing reflective optical beam 150 facilitates increasing a distance from which interrogation device 130 may interrogate container 110 and/or facilitates reducing a minimum light level required for interrogating container 110 such that eye safety is facilitated to be increased. For example, in the embodiment shown in FIG. 4, base layer 220 is selected to substantially diffuse optical beam 140 such that reflected optical beam 150 may be directed in a plurality of directions. In such an embodiment, a single projection system 132 may project an optical beam 140 producing a reflected optical beam 150 that is detectable by a plurality of receivers 134 positioned at various locations. In the embodiment shown in FIG. 5, base layer 220 is selected to substantially co-align a plurality of wavelengths of reflective optical beam 150. In such an embodiment, a plurality of projection systems 132 may each project optical beam 140 producing a reflected optical beam 150 that is detectable by a single receiver 134. In the embodiment shown in FIG. 6, base layer 220 includes a plurality of corner-cube reflectors and/or refractive beads that have retroreflective properties. In such an embodiment, base layer 220 is selected to direct reflective optical beam 150 generally towards a source of optical beam 140 such that projection system 132 and receiver 134 may be housed within a common interrogation device 130.

In the exemplary embodiment, substrate 100 includes a concealing layer 230 that is substantially opaque to wavelengths of less than approximately 790 nm and that is substantially transmissive to wavelengths that are greater than and/or equal to approximately 790 nm. That is, concealing layer 230 is opaque to wavelengths in the visible spectrum and prevents such wavelengths from passing through while allowing wavelengths in the infrared spectrum to pass through. As such, in the exemplary embodiment, concealing layer 230 substantially masks the underlying data without inhibiting interrogation device 130 from functioning as described herein.

In one embodiment, substrate 100 may include at least one layer and/or region that is configured to indicate an environmental change. More specifically, in such an embodiment, the at least one layer and/or region may enable environmental change information to be detectable while retaining at least some of the information encoded in substrate 100. That is, interrogation device 130 may detect environmental change information in addition to other encoded information including, without limitation, contents of container 110. For example, substrate 100 may include a temperature-sensitive region (not shown) that is indicative of a temperature to which substrate 100 and/or container 110 is exposed. More specifically, in such an embodiment, the temperature-sensitive region may indicate whether substrate 100 and/or container 110 is and/or had been exposed to a predetermined temperature.

For another example, in the exemplary embodiment, substrate 100 includes a tamper layer 240 that is tamper-evident and/or tamper-proof. In the exemplary embodiment, tamper layer 240 is configured to indicate whether substrate 100 and/or container 110 has been tampered with and/or may prevent substrate 100 from being tampered with. In one embodiment, tamper layer 240 includes at least one chemically-coated thread configured to indicate when tamper layer 240 is actuated and/or disturbed. In such an embodiment, the thread may change at least some optical properties of substrate 100 when tamper layer 240 is tampered with and/or container 110 is opened. In another embodiment, tamper layer 240 includes a scraper configured to actuate and/or disturb tamper layer 240 to change at least some optical properties of substrate 100 when, for example, substrate 100 is tampered with and/or container 110 is opened.

The embodiments described herein enable a unique substrate or security indicator to be read at longer distances. For example, a vessel or container may be identified before a transportation modality or a vessel enters a port and potentially poses a serious threat. Moreover, a plurality of vessels and/or containers may be monitored from a long distance. As such, the embodiments described herein enable a quantity of interrogated vessels to be increased. Furthermore, the embodiments described herein enable search-and-rescue missions to be conducted effectively and/or efficiently.

The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the present invention, including the best mode, and also to enable any person skilled in the art to practice those certain embodiments, including making and using any devices or systems and performing any incorporated methods. The patentable scope of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of identifying an object, said method comprising:
    receiving reflected electromagnetic radiation associated with a substrate that includes a first layer having a first matrix of zones and a second layer having a second matrix of zones, the second matrix of zones being directly below the first matrix of zones, wherein the substrate is coupled to the object to represent optically coded information associated with the object, and at least one zone of the first matrix of zones or the second matrix of zones is configured to absorb a predetermined first wavelength from electromagnetic radiation;
    extracting the optically coded information from a pattern created by wavelengths associated with the reflected electromagnetic radiation; and
    calibrating a layer, of said substrate, having a second spatial resolution that is greater than the first spatial resolution wherein the first matrix of zones and the second matrix of zones have a first spatial resolution.

2. A method in accordance with claim 1 further comprising:
    transmitting the first wavelength of the electromagnetic radiation at a first time; and
    transmitting a predetermined second wavelength of the electromagnetic radiation at a second time, wherein at least one zone of the second matrix of zones is configured to absorb the second wavelength of the electromagnetic radiation.

3. A method in accordance with claim 1, wherein at least one zone of the first matrix of zones or the second matrix of zones is configured to absorb a predetermined second wavelength from the electromagnetic radiation.

4. A method in accordance with claim 1, wherein at least one zone of the first matrix of zones and the second matrix of zones is transmissive to a defined range of wavelengths from the electromagnetic radiation.

5. An encoded substrate comprising
    a first layer of material having a first matrix of zones arranged on a surface thereof and a second layer of material having a second matrix of zones arranged on a surface of the second layer such that the second matrix of zones are directly below the first matrix of zones,
    the first matrix of zones and the second matrix of zones representing optically coded information,
    wherein at least one zone of the first matrix of zones or the second matrix of zones is configured to absorb a predetermined first wavelength from electromagnetic radiation, such that the optically coded information can be obtained from a pattern of wavelengths associated with a reflection of the electromagnetic radiation, and
    wherein the first matrix of zones and the second matrix of zones have a first spatial resolution, and said encoded substrate further comprises a calibrating layer having a second spatial resolution that is greater than the first spatial resolution.

6. An encoded substrate in accordance with claim 5 further comprising a base layer extending under said second layer of material, wherein said base layer is configured to reflect the electromagnetic radiation.

7. An encoded substrate in accordance with claim 5 further comprising a base layer extending under said second layer of material, wherein said base layer is configured to reflect a first electromagnetic radiation emitted from a first source and a second electromagnetic radiation emitted from a second source in a common direction.

8. An encoded substrate in accordance with claim 5 further comprising a base layer extending under said second layer of material, wherein said base layer is configured to reflect the electromagnetic radiation towards a source of the electromagnetic radiation.

9. An encoded substrate in accordance with claim 5, wherein said at least one zone is configured to indicate a change to at least one of the substrate and an environment of the substrate.

10. An encoded substrate in accordance with claim 5 further comprising at least one of a tamper evident layer and a tamper proof layer.

11. A system for identifying an object, said system comprising:
a substrate comprising a first layer of material having a first matrix of zones arranged on a surface thereof and a second layer of material having a second matrix of zones arranged on a surface of the second layer such that the second matrix of zones are directly below the first matrix of zones,
the first matrix of zones and the second matrix of zones representing optically coded information associated with the object,
wherein at least one zone of the first matrix of zones or the second matrix of zones is configured to absorb a predetermined first wavelength from electromagnetic radiation;
wherein the first matrix of zones and the second matrix of zones have a first spatial resolution, and said substrate further comprises a calibrating layer having a second spatial resolution that is greater than the first spatial resolution; and
a scanner configured to:
receive a reflection of the electromagnetic radiation associated with at least one of the first matrix of zones and the second matrix of zones; and
extract the optically coded information from a pattern created by wavelengths associated with the reflected electromagnetic radiation.

12. A system in accordance with claim 11, wherein said encoded substrate further comprises a base layer extending under said second layer of material, said base layer configured to reflect the electromagnetic radiation.

13. A system in accordance with claim 12, wherein said scanner is further configured to compare the reflected electromagnetic radiation with a database of values representing known information.

14. A system in accordance with claim 11, wherein said substrate further comprises a base layer extending under said second layer of material, and said base layer is configured to reflect a first electromagnetic radiation emitted from a first source and a second electromagnetic radiation emitted from a second source in a common direction.

15. A system in accordance with claim 11, wherein said substrate further comprises a base layer extending under said second layer of material, and said base layer is configured to reflect the electromagnetic radiation towards a source of the electromagnetic radiation.

16. A system in accordance with claim 11, wherein the first matrix of zones and the second matrix of zones have a first spatial resolution, and said encoded substrate further comprises a calibrating layer having a second spatial resolution that is greater than the first spatial resolution.

17. A system in accordance with claim 11, wherein said at least one zone is configured to indicate a change to at least one of the substrate, an environment of the substrate, and the object.

18. A system in accordance with claim 11 further comprising at least one of a tamper evident layer and a tamper proof layer.

19. A system in accordance with claim 11, wherein said scanner is further configured to transmit the first wavelength of the electromagnetic radiation at a first time and transmit a predetermined second wavelength of the electromagnetic radiation at a second time, and at least one zone of the second matrix of zones is configured to absorb the second wavelength of the electromagnetic radiation.

\* \* \* \* \*